United States Patent Office 2,920,963
Patented Jan. 12, 1960

2,920,963
EDIBLE CASTOR CAKE PRODUCT AND METHOD OF PRODUCING THE SAME

Egon Darzins, Minneapolis, Minn.

No Drawing. Application January 17, 1956
Serial No. 559,520

3 Claims. (Cl. 99—9)

This application constitutes a continuation-in-part of my co-pending application entitled Edible Castor Cake Product and Method of Producing the Same, S.N. 323,495, filed December 1, 1952, and now abandoned.

This invention relates to the utilization of the proteins of the castor bean and particularly to the production of a reconstituted castor cake product, high in nutritious proteins and amino acids and free of all toxic substance and particularly adapted as a feed for animal production and for high protein, industrial use.

The high content of protein and the presence of an extremely toxic substance, ricin, a specific form of protein, stimulated at an early date unusually great interest in the investigation and possible uses of the proteins of this seed. The seeds are composed of about 25% husk and 75% kernel. The castor bean in the past years, has been raised almost exclusively for its oil which is extensively used for medicinal and industrial and lubricant purposes and which in later years, in dehydrogenated state, has been found valuable for use in paints.

The kernel constitutes the source of the castor oil. In some types of castor beans, the oil from the kernel runs as high as 66% by volume of the entire whole seed. Protein comprises as high as 18% of the whole seed and over 35% of the kernels of the bean. Dr. T. B. Osborne, as early as 1892, did exhaustive research work on the castor bean, castor cake alone and in conjunction with other scientists, published many articles in the American Chemical Journal and in the Journal of the American Chemical Society relating to his findings as to the composition of castor cake, proteins contained therein, amino acid contents and content and nature of ricin.

Ricin comprises, according to the best authorities, about one and five tenths percent of the oil-free meal. It contains no phosphorous and, according to authorities, has the following percentage composition: C, 52.01; H, 7.02; N, 16.56; S, 1.29.

Ricin has been found to be an albumin and to constitute a part of the natural proteins present in the kernel of the castor bean. Like all alubumins, pure ricin remains soluble in water and remains in solution after all of the globulin has been separated from a saline extract of the meal. From past scientific work, the fact seems now undisputed that ricin as other toxalbumins differ in some pronounced manner from other proteins and that their toxicity is a peculiar property of the protein itself.

The toxic effects of ricin produces after several hours, a paralysis of the respiratory and vasomotor systems. Consumption by mouth causes diarrhea, general prostration and hemorrhagic condition of the intestines, renal congestion and hypermia of the spinal medulla and brain. It agglutinates the red blood corpuscles, this agglutination being more pronounced in mammals than in fowls.

To my knowledge, there has never been a castor meal product or protein extract therefrom capable of commercial manufacture and production or even capable of careful individual production, wherein the ricin was completely removed, detoxicated or converted to an edible protein.

It is an object of my invention after many years of exhaustive research and study of castor cake, its composition and all of the ingredients thereof, to provide a new and reconstituted castor cake or castor cake product wherein all poisonous albumins or proteins including ricin are changed into non-poisonous proteins and which product is preferably prepared in granulated, pulverized or cake form, entirely free from any poisonous substance as well as castor oil and being of exceedingly high value for the feeding of stock including mammals and poultry and for industrial use.

A further object is the provision of a comparatively simple process for commercially producing or preparing such a valuable and nutritious product through a sequence of physical and chemical steps in the treatment of castor cake after substantially all the oil and preferably but not necessarily, the husks have been removed.

My new product or composition is a cake which may be made into pulverized or granular form when dried, substantially white (very slightly gray in color) and has very desirable taste to domestic mammals and fowls. Its protein content may exceed 34% and includes a relatively very high amino acid content, extremely desirable in feeding.

I will now describe my method by which said unexpected and valuable new product may be readily and commercially produced, it being understood that several of the steps hereinafter designated as preferred, may be eliminated or modified while nevertheless producing a product entirely free from all toxic substances and from castor oil and containing very high protein value.

The natural castor beans are preferably first peeled or skinned in any of the accepted commercial methods thereby removing large quantities of carotenoid pigments and some amount of the superficial layer of kernel, containing poisonous ricin cells. After the peeling, the protein content of the beans will vary from 35% to 40% determined in extracted meal, after the oil is substantially completely extracted. It is to be understood that the skins need not be first removed.

The castor bean meal obtained either from peeled or unpeeled beans is prepared in comminuted state and is dried in any conventional manner. The meal after drying is then preferably again comminuted to a second fine milling forming a flour.

The oil is then extracted from this flour in any of the conventional manners. The oil may be directly extracted by hydraulic press or the solvent method of extraction may be utilized, imposing as the chemical solvent sulfuric or petrol ether, light benzine or commercial hexane in the approximate proportion of one part castor cake flour to two parts of the extract. The extraction is carried out in the requisite time (usually about three hours) and the solvent is then drained and the resulting flour dried.

In my process, the dry flour obtained in either of the manners previously described is mixed with water in the proportion of approximately one to three by volume although this proportion may be considerably varied with successful results. The mixture is stirred and thoroughly agitated, remaining for about three hours, whereafter the water is drained off. This draining removes more soluble carotenoid pigments, considerable portion of water soluble allergens and a part of the water soluble, poisonous albumin, but most of the ricin albumins and globulins remain in the flour or cake.

In the next step, the wet flour is mixed for the second time with water, preferably in the proportion of substantially one to three by volume.

A selected, strong proteolytic bacteria culture is preferably added at this time to the mixture, although it may be added subsequently during part of the procedure of fermentation or autodigestion. Various proteolytic bacteria may be used such as Pseudomonas or other bacteria, for example others obtained from decomposed organic substances, including those isolated from sewage. In the example hereinafter given, the bacteria utilized and isolated from sewage is Clostridium. It is important that several cultures must be made and tested on coagulated egg whites and gelatin substances, to be sure that the one selected is strong, virile and has strong proteolytic activity. From the culture selected, a bacterial broth is made in conventional manner. The selected culture is added to the aqueous mix, approximately in the proportion of 20 milliliters of the culture to form four to five kilograms of the meal actually utilized in the wet mix. It is of course to be understood that these proportions may be varied reasonably to nevertheless produce highly successful results.

The wet mix with the strong proteolytic bacteria culture preferably added at this time, is then submitted to fermentation and auto-digestion caused by such bacteria and by the natural enzymes of beans, for preferably a period of about 72 hours, at a temperature varying within a range of from 20 to 45 degrees C. (preferably between 25 and 35 degrees C.). In the fermentation, the enzymes are liberated from the cells and the culture, the cells are split and the proteins become soluble in water with the result that most, but not all of the toxic ricin is destroyed or converted in auto-digestion.

The terms "fermentation" and "auto-digestion" as used herein mean and include process of self-digestion by autolysis occurring in the natural castor bean tissues as well as the destruction and dissolving of cells by outside agents and enzymes through the process of heterolysis.

I have discovered that to ferment and produce proper auto-digestion for successful results and reduction and conversion of all toxic ricin, the substantially liquid mass of castor bean flour and water must be maintained throughout the term of auto-digestion (through autolysis and heterolysis) at a pH from 7.5 to 9. To this end, my said step of auto-digestion includes the addition of an amount of alkaline of the earth metals (preferably calcium hydroxide) approximately in the proportion of one half to one percent of the mass by weight. Salts of sodium magnesium and strontium or potassium may be substituted for the calcium hydroxide. Sodium or potassium hydroxides, however, subsequently produce small quantities of water soluble soaps.

In the carrying out of my method, I have found it of substantial advantage but not essential, to add from one half to one percent by weight of sodium chloride to the wet mixture. The addition of this chloride facilitates the solubility of the auto-digestion of protein.

After auto-digestion and/or fermentation for aproximately 72 hours, the digested mass is transferred into an autoclave or the like and heated for one hour at a temperature within a range of from 100 degrees to 120 degrees C. (at a pressure of one atmosphere gauge). In this step, the minute quantities of castor oil which may remain in the flour and which may be liberated through auto-digestion are converted into insoluble, non-toxic lime soap.

In the auto-digestion at specified pH, and subsequent heating under pressure, the poisonous ricin albumins and other proteins coagulate and convert into proteins which have no toxicity. The last mentioned step in the heating under pressure (autoclave) at a temperature between 100 and 120 degrees C., converts and detoxicates the slightest remaining, poisonous albumin.

After autoclaving the digested mass the water is drained off and the mass is dried to leave a granulated or pulverized material, where less than 6% moisture remains. The product is white in color, having a grayish tinge depending on the amount of husk present in the meal and this product by tests on red blood cells and upon animals, is found to have no toxicity and no ricin present.

The products may be obtained as a cake or the mass may be milled or comminuted to granular or pulverized state. The dried product almost always contains up to 32% non-toxic, half-digested and boiled proteins, the proteins decreasing in proportion according to the amount of husk present in the original meals. This product has been proved to have very high feeding value for mammals and fowls. Not only is the product highly nutritious, but carefully conducted feeding tests have shown that the product has desirable taste qualities to fowls and domestic animals.

From the foregoing description, it will be seen that I have discovered a simple, practical method for treating castor bean cake or flour to eliminate and/or convert all poisonous protein or other ingredients contained in the natural castor bean and resulting in the production of a new or converted product of high nutritive value containing up to approximately 32% protein and being high in the desirable amino acids.

What is claimed is:

1. The method of producing a converted, high protein, non-toxic castor cake product from originally toxic castor bean cake which consists in first mixing a quantity of comminuted, substantially oil-free castor cake with a larger proportion of water and leaving the mixture for a period in excess of two hours and then draining off the water to remove soluble carotenoid pigments and a portion of water-soluble allergens and a part of the water-soluble, poisonous albumins, then adding water to the mass remaining in the proportion of substantially three-to-one and then fermenting and auto-digesting said mixture of mass and water with a culture of a selected, strong proteolytic bacteria such as a Clostridium obtained from decomposed sewage substance for a period in excess of 60 hours at a temperature range between 20 degrees and 45 degrees C., to ferment the mixture through the natural enzymes liberated from the cells in said auto-digestion while maintaining said mixture at a pH above 7.4 and consecutively heating under pressure and thereafter separating off the water and soluble matter contained therein and drying the resultant mass, said heating before the draining off of water, being carried out at a temperature between 100 and 120 degrees C.

2. The method of producing a converted, high protein, non-toxic castor cake product from originally toxic castor bean cake containing ricin which comprises thoroughly fermenting a mixture of finely comminuted, natural castor cake which has been thoroughly admixed with a greater part by volume of water solely through application to said mixture of a culture of a strong proteolytic bacteria of the specific class including Clostridium obtained from decomposed sewage substance for a period in excess of 50 hours at a temperature range between 25 and 35 degrees C., while maintaining said mixture during said period at a pH somewhat above 7.4 and then heating said mass after expiration of said period at a temperature between 100 and 120 degrees C., at a pressure of one atmosphere gauge for a short period approximating one hour and then draining off the remaining water from the mass and drying the mass.

3. The method of producing a converted, high protein, non-toxic castor cake product from originally toxic castor bean cake containing ricin which consists in fermenting a mixture of finely comminuted, natural castor cake from which the skin was removed from the bean prior to comminution, said fermentation being carried out solely through addition of a culture of strong Clostridium bacteria obtained from decomposed sewage substance to a mixture of said comminuted cake with a greater proportion by volume of water, the proportion of said culture added being in approximation to 20 milliliters of culture to 4½ kilograms of the comminuted meal utilized, said fermentation being continued through a period approximating 70 hours at a temperature range between 25 and 35 degrees C., while maintaining said mixture during that period at a pH between 7.4 and 9, heating said mass after expiration of said period for a short period approximating an hour at a temperature between 100 and 120 degrees C., at a pressure of one atmosphere gauge and then draining off the remaining water from the mass.

References Cited in the file of this patent

UNITED STATES PATENTS 2,297,434     Rudolph     Sept. 29, 1942
2,516,128     Le Breton     July 25, 1950

OTHER REFERENCES

Buchanan: Bacteriology, 4th ed., 1938, Macmillan Co., New York City, pp. 55, 310–312.